(12) United States Patent
Buckingham et al.

(10) Patent No.: US 9,919,640 B2
(45) Date of Patent: Mar. 20, 2018

(54) SYSTEM AND METHOD FOR CONTROLLING DOLLIES

(71) Applicants: Mark Allen Buckingham, Bernville, PA (US); Jamin Ray Buckingham, Bernville, PA (US)

(72) Inventors: Mark Allen Buckingham, Bernville, PA (US); Jamin Ray Buckingham, Bernville, PA (US)

( * ) Notice: Subject to any disclaimer, the term of this patent is extended or adjusted under 35 U.S.C. 154(b) by 0 days.

(21) Appl. No.: 14/595,597

(22) Filed: Jan. 13, 2015

(65) Prior Publication Data

US 2016/0200236 A1 Jul. 14, 2016

(51) Int. Cl.
*B60P 3/40* (2006.01)
*G05D 1/02* (2006.01)
*B62D 6/00* (2006.01)
*B60W 40/114* (2012.01)
*B60W 10/20* (2006.01)

(52) U.S. Cl.
CPC ............ *B60P 3/40* (2013.01); *B60W 10/20* (2013.01); *B60W 40/114* (2013.01); *B62D 6/005* (2013.01); *G05D 1/0293* (2013.01); *B60W 2520/14* (2013.01); *B60W 2710/207* (2013.01); *G05D 2201/0202* (2013.01)

(58) Field of Classification Search
CPC . B60P 3/40; G05D 1/0293; G05D 2201/0202; B62D 6/005; B60W 40/114; B60W 10/20; B60W 2520/14; B60W 2710/207
See application file for complete search history.

(56) References Cited

U.S. PATENT DOCUMENTS

| 4,044,854 | A | | 8/1977 | Schmitt | |
|---|---|---|---|---|---|
| 4,955,630 | A | * | 9/1990 | Ogren | B62D 13/04 280/100 |
| 5,112,073 | A | * | 5/1992 | McGhie | B62D 7/04 280/404 |
| 5,825,284 | A | * | 10/1998 | Dunwoody | B60G 17/0162 340/438 |
| 6,371,505 | B1 | * | 4/2002 | Turner, II | B60P 3/00 280/404 |
| 6,494,476 | B2 | * | 12/2002 | Masters | B62D 13/005 280/419 |
| 7,950,478 | B2 | | 5/2011 | Terry | |
| 2001/0027892 | A1 | | 10/2001 | Masters et al. | |
| 2002/0180178 | A1 | | 12/2002 | Masters et al. | |
| 2004/0160084 | A1 | | 8/2004 | Mason et al. | |

(Continued)

OTHER PUBLICATIONS

Notification of Transmittal of the International Search Report and the Written Opinion of the International Searching Authority dated Apr. 20, 2016, in connection with corresponding PCT Application No. PCT/US2016/012198 (21 pages).

*Primary Examiner* — Rami Khatib
*Assistant Examiner* — Jeffrey Boomer
(74) *Attorney, Agent, or Firm* — Maier & Maier, PLLC

(57) ABSTRACT

According to at least one exemplary embodiment, a system and method for synchronizing and controlling at least one dolly may be provided. The system may include at least one dolly, a power unit, and a control device, all communicatively coupled via at least one network. Dolly coordinates and steer points for a load may be recorded. Adjustments to the dolly may be made based on desired changes to the orientation of the steer points.

9 Claims, 12 Drawing Sheets

(56) References Cited

U.S. PATENT DOCUMENTS

| | | | |
|---|---|---|---|
| 2005/0031431 A1* | 2/2005 | Wobben | B60P 3/40 410/45 |
| 2005/0062590 A1* | 3/2005 | Lang | B60D 1/62 340/431 |
| 2005/0212243 A1* | 9/2005 | Terry | B62B 3/001 280/79.11 |
| 2006/0111820 A1* | 5/2006 | Goetting | B62D 13/06 701/1 |
| 2006/0208873 A1* | 9/2006 | Lesesky | G07C 5/008 340/531 |
| 2006/0290102 A1* | 12/2006 | VanBuskirk, Jr. | B60D 1/58 280/511 |
| 2007/0090688 A1 | 4/2007 | Haemmerling et al. | |
| 2009/0236823 A1 | 9/2009 | Prem et al. | |
| 2011/0266774 A1* | 11/2011 | Gregg | B62D 13/00 280/419 |
| 2012/0067653 A1 | 3/2012 | Mallett et al. | |
| 2012/0072109 A1* | 3/2012 | Waite | B60K 35/00 701/431 |
| 2013/0015631 A1* | 1/2013 | Holland | B62D 1/00 280/98 |
| 2014/0085472 A1* | 3/2014 | Lu | B60R 1/002 348/148 |
| 2014/0310958 A1* | 10/2014 | Yu | F03D 1/001 29/889.21 |
| 2015/0042073 A1* | 2/2015 | Nooren | B60P 3/40 280/504 |
| 2015/0197281 A1* | 7/2015 | Miller | B62D 13/06 701/41 |
| 2015/0339624 A1* | 11/2015 | Lozito | G06Q 10/08 705/333 |
| 2016/0019497 A1* | 1/2016 | Carvajal | G06Q 10/08 701/519 |
| 2016/0039457 A1* | 2/2016 | Klank | B62D 1/046 701/41 |
| 2016/0049020 A1* | 2/2016 | Kuehnle | G07C 5/0808 701/34.4 |
| 2016/0054735 A1* | 2/2016 | Switkes | G08G 1/22 701/23 |
| 2016/0129896 A1* | 5/2016 | Tu | B60T 8/248 701/70 |
| 2016/0167583 A1* | 6/2016 | Schrepfer | B60R 1/00 348/148 |

* cited by examiner

SYSTEM AND METHOD FOR CONTROLLING DOLLIES

BACKGROUND

Dollies come in a variety of configurations and are generally used to lift and transport heavy objects. Some heavy duty dollies are used to transport extremely large loads, including buildings and other large structures. These heavy duty dollies may be self-propelled or coaster dollies. These dollies may further be capable of steering, braking, and also lifting. When moving extreme loads, such as buildings and large structures, multiple dollies may be used in combination. Traditionally, these dollies have required individual attention and manipulation to safely steer a load. The use of come-alongs and various other mechanical steering aids have been employed in an attempt to synchronize the movement of multiple dollies. For example, two dollies in parallel may have their steering set in unison by connecting tongues of the dollies with a solid bar. This may cause the tongues and consequently the steering axles of the dollies to move as one. Come-alongs may secure the tongue of a dolly to the frame of a load, causing the dolly to follow the load. However, when using a plurality of dollies, there is a constant need for individual attention and correction. This requires an increased amount of man power and ultimately limits the size of a load that can be hauled.

SUMMARY

According to at least one exemplary embodiment, a load transport system be provided. The system may include at least one dolly. The dolly may have a top cap encoder and front axle encoder. The encoders may communicate data to a dolly control unit. The system may also include at least one power unit, which may have a power unit computer. The dolly control unit may communicate the encoder data to the power unit computer over a network. The system may further include a control device that is configured to communicate over a network with the power unit computer and which may allow a user to view and manipulate system data, instructing the power unit computer. The power unit computer may make calculations based on the data to determine necessary adjustments to the at least one dolly. The power unit computer may then cause the power unit to actuate components of the dolly to attain the calculated adjustments.

According to another exemplary embodiment, a method for transporting a load may be provided. The method may include providing at least one dolly, at least one power unit, and a control device. The at least one dolly may include a top cap encoder and front axle encoder communicatively coupled to a dolly control unit. The top cap encoder and front axle encoder may communicate measured data to the dolly control unit. The power unit may include a power unit computer communicatively coupled with the at least one dolly control unit via a network. The at least one dolly control unit may communicate the measured data to the power unit computer. The control device may be configured to communicate with the power unit computer via a network and it may allow a user to view and manipulate system data, and provide instructions to the power unit computer. The method may further include entering baseline data comprising dolly coordinates and steer point coordinates. A desired steer point orientation may then be entered. Next, the method may include allowing the power unit computer to calculate necessary adjustments to the at least one dolly based on the dolly control unit data and user input data. The power unit computer may be allowed to instruct the power unit to actuate the at least one dolly to achieve the adjustments. The method may also include instructing the at least one dolly to drive as desired through one of the control device or a separate drive control device. Lastly, the method may include adjusting the desired steer point orientation and drive instructions as desired.

According to yet another exemplary embodiment, a computer program product may be provided. The computer program product may be implemented on a processor and may include code for causing the components of a load transport system to execute a series of steps. Steps may include receiving top cap encoder data from at least one dolly, receiving front axle encoder data from at least one dolly, receiving baseline coordinate data for at least one dolly and a front and rear steer point, from a user, and receiving a desired front and rear steer point orientation. The computer program product may further cause the system to calculate dolly adjustments based on the received data and desired inputs. It may then instruct a power unit to actuate the adjustments.

According to a further exemplary embodiment, an apparatus for transporting a load may be provided. The apparatus may include a dolly having an adjustable front axle and an adjustable top cap for supporting a load. It may further include a power unit configured to actuate the components of the dolly. The power unit may have a power unit computer for processing data and instructing the power unit to actuate dolly components. There may also be a control device in communication with the power unit for entering and manipulating data to instruct the actuation of the dolly.

According to yet another exemplary embodiment, a load transport system be provided. The system may include at least one dolly. The dolly may have at least one encoder. The at least one encoder may communicate data to a dolly control unit. The system may also include at least one power unit, which may have a power unit computer. The dolly control unit may communicate the encoder data to the power unit computer over a network. The system may further include a control device that is configured to communicate over a network with the power unit computer and which may allow a user to view and manipulate system data, instructing the power unit computer. The power unit computer may make calculations based on the data to determine necessary adjustments to the at least one dolly. The power unit computer may then cause the power unit to actuate components of the dolly to attain the calculated adjustments.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

Exemplary

Exemplary

Exemplary

Exemplary

Exemplary

Exemplary

Exemplary

Exemplary

DETAILED DESCRIPTION OF THE EMBODIMENTS

Figure 1:
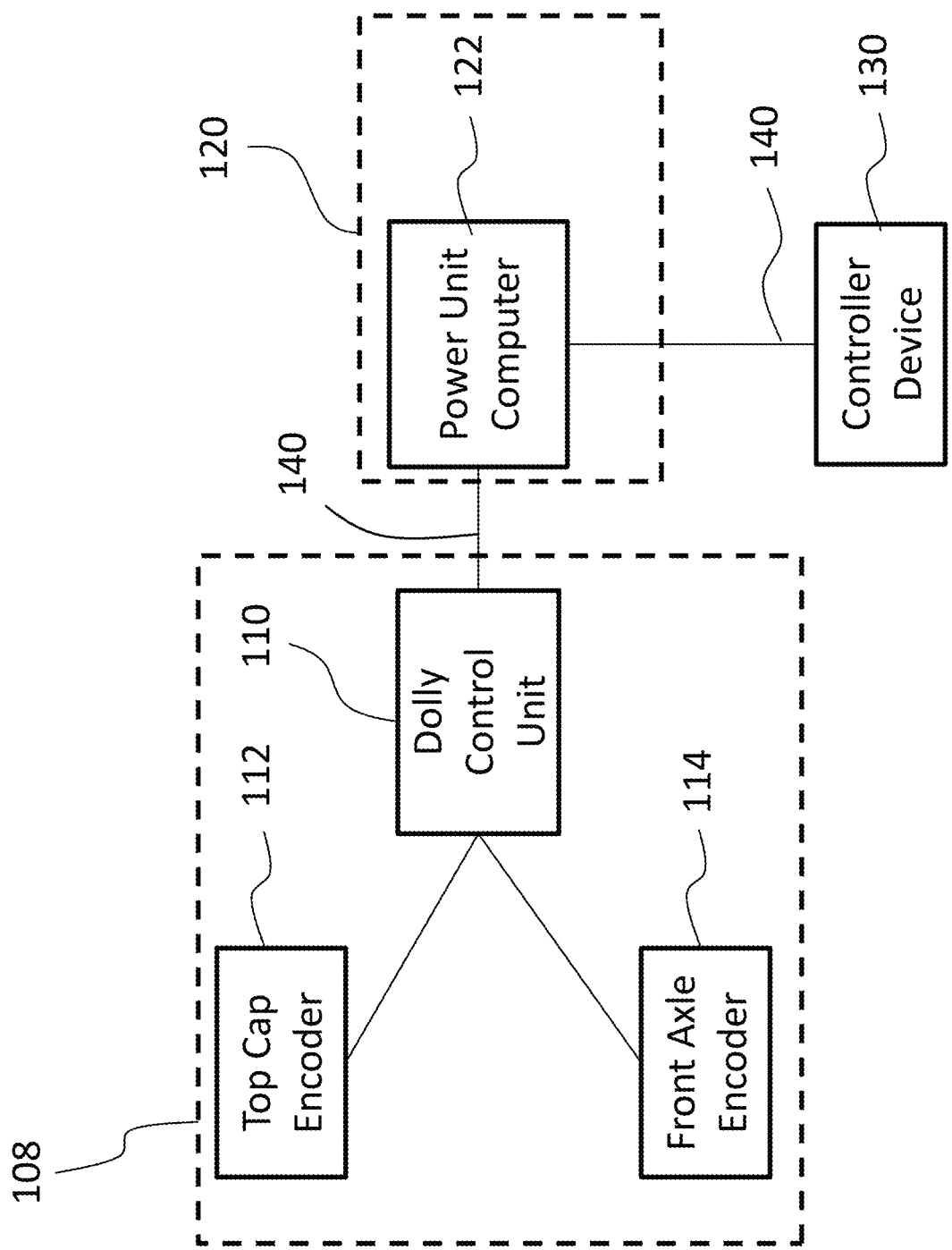
FIG. 1 shows a diagram of a dolly transport system.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

According to some exemplary embodiments, and generally referring to FIGS. 1-11, a dolly transport system 100 may be provided. Transport system 100 may include at least one dolly used to support and transport heavy loads. In an exemplary embodiment, the system may incorporate a plurality of individual dollies to transport a single load. Individual dollies may include a frame and at least one axle. In an exemplary embodiment, a dolly may have two axles. In some embodiments, one axle may be a steering axle, which may be configured to turn in relation to the frame. In other embodiments, both axles may be steering axles, which may be configured to turn in relation to the frame. In yet other embodiments, all axles may have a fixed orientation. Alternatively, the frame may be configured to pivot, causing the axle orientation to turn. Dollies may further include wheels, some or all of which may optionally have a fixed orientation in relation to the at least one axle. Alternatively, some or all of the wheels may turn independently of the at least one axle.

Additionally, each wheel may optionally rotate in unison with an axle or independently. It may be understood by a person having ordinary skill in the art, that these and various other dolly embodiments may be used substantially as described herein.

Exemplary dollies may be power dollies, coaster dollies, or a combination thereof. A power dolly may be able to initiate movement of a load, while a coaster dolly may require another source to initiate movement of a load, such as a power dolly used in combination with the coaster dolly. Some coaster and power dollies may provide power steering, braking, and load height adjustment capabilities. In an exemplary embodiment, the dollies may be hydraulically powered and may be coupled to a hydraulic power unit. The braking system may be an air brake system and the air system may further be incorporated in the power unit. In some alternative exemplary embodiments, the dollies may be electric powered. The components of the system, including the dollies and power units may function substantially the same in an electric powered embodiment. In further alternative embodiments, the dollies may be powered by internal combustion, steam, hybrid, or other combinations or forms of power, as would be understood by a person having ordinary skill in the art.

Now referring to exemplary FIG. 1, a transport system 100 may include at least one dolly 108, at least one power unit 120, a control device 130, and at least one network 140. A dolly 108 may include a dolly control unit 110 and at least one encoder. In an exemplary embodiment, a dolly 108 may have at least one encoder configured to monitor each independently adjustable component, including a top cap, axles, wheels, or a pivoting frame. In at least one exemplary embodiment having a dolly 108 with a steering front axle and a top cap, dolly 108 may include a top cap encoder 112, and a front axle encoder 114. Other embodiments having corresponding components used in accordance with the above example may be understood by a person having ordinary skill in the art. For example, a dolly having a top cap and front and rear steering axles, the dolly 108 may include a top cap encoder 112, a front axle encoder 114, and a rear axle encoder.

While other embodiments may be configured and operate in accordance with the present description, an exemplary embodiment having a top cap and front steering axle may be used for explanatory purposes. The dolly control unit 110 may be communicatively coupled to the top cap encoder 112 and front axle encoder 114. In an exemplary embodiment, the top cap encoder 112 and front axle encoder 114 may be communicatively coupled to a dolly control unit 110. In some exemplary embodiments, the top cap encoder 112 and front axle encoder 114 may be hard wired to a dolly control unit. The use of such internal encoders may allow the system to operate in a variety of conditions without interference. The top cap encoder 112 may monitor the orientation of a dolly top cap. In an exemplary embodiment, a top cap encoder 112 may monitor a dolly top cap through a series of cables, pulleys, springs and shafts, which may be connected to the top cap and may operate the encoder in correlation to changes in the top cap orientation. The top cap encoder 112 may report the rotation of the dolly at all times. A dolly top cap may be the support surface for a load being transported. The top cap may be secured to the load by clamps, bolts, and other fasteners as understood by a person having ordinary skill in the art. In an exemplary embodiment, the top cap may be configured to rotate in relation to the dolly frame and adjust in height. The adjustable orientation of the top cap, including rotation and height, may optionally facilitate oscillation of the dollies under a load as they traverse changing terrain.

The front axle encoder 114 may similarly monitor the position and orientation of the front axle and may communicate data to the dolly control unit 110. The front axle may be a straight axle, such that the wheels turn as one. In some alternative exemplary embodiments, the axle may be a split axle. In some further embodiments, each wheel of a dolly may turn independently. An individual encoder may be utilized to monitor and report data for each wheel in embodiments having independently turning wheels. A dolly having independently turning wheels may function substantially as described herein through the use of individual encoders for each independently turning wheel. The dolly control unit 110 may include a computer configured to process and communicate data from the top cap encoder 112 and front axle encoder 114. In some exemplary embodiments, the computer may be a microcontroller. Software embedded in the dolly control unit 110 may convert the data to a desired code for communication to a power unit 120. In some alternative embodiments, laser systems or GPS may be used to measure system data such as dolly location and orientation.

Each dolly control unit 110 may be communicatively coupled to a power unit 120 via a network 140. In an exemplary embodiment, this network may be a CAN network, such as a J1939 CAN network. Other protocols or types of networks may be used in alternative embodiments, as would be understood by a person having ordinary skill in the art. In an exemplary embodiment, the network communications may be wired. This may allow the system 100 to be without interruptions in communication which may be caused by the nature of the load or the environment. However, in some alternative embodiments, the communications may be wireless through the use of a wireless transceiver, such as a Bluetooth, Wi-Fi, infrared, RF or microwave transceiver. A power unit 120 may be incorporated in an individual dolly 108, affixed to a dolly 108, or remotely coupled to a dolly 108. In an exemplary embodiment, each dolly 108 may be controlled by its own power unit 120. Alternatively, in some embodiments, a single power unit 120 may control a plurality of dollies 108. The power unit 120 may further be communicatively coupled to a control device 130. The control device 130 may allow a user to oversee and instruct the system 100. In an exemplary embodiment, the power unit 120 and control device 130 may also communicate via a network 140.

Software may be implemented in the power unit 120, the dolly control unit 110, and the control device 130. As described above, the dolly control unit 110 may receive data from the top cap encoder 112 and front axle encoder 114. In some exemplary embodiments, data from the encoders may be in the form of a pulse count. Software in the dolly control unit 110 may convert the data as desired for transmission. The data may then be communicated to the power unit 120. The power unit 120 may include a power unit computer 122 configured to process the data. In embodiments utilizing multiple power units, the individual power units 120 may be communicatively coupled so as to separately, but synchronously control the dollies. In some alternative embodiments, individual power units 120 may be linked to a master power unit, which may be used to control the entire system. Calculations based on the data may subsequently be made by software embedded in a power unit computer 122. The power unit computer 122 may be a microcontroller, standard processor, laptop, or a smart device. In some further exemplary embodiments, the power unit computer 122 may control the power unit 120 remotely. The calculations may utilize data input by a user through the control device 130 and data communicated from the dolly control unit 110. The power unit computer 122 may subsequently instruct the power unit to initiate adjustments to the dolly, such as causing the dolly's front axle to turn. In an exemplary embodiment, adjustments may be accomplished through the transfer or pressurization of hydraulic fluid. In an exemplary embodiment, hydraulic lines may run between a power unit 120 and a dolly 108. The hydraulic lines may allow hydraulic communication between the power unit 120 and the components of a dolly 108, such as a hydraulic power steering system, a hydraulic drive system, and a hydraulic system for lifting or rotation a top cap of the dolly 108. The power unit computer 122 may actuate valves for a particular dolly or component to steer and correct dolly orientation to meet desired orientation data input through the control device 130. The power unit computer 120 may further be configured to initiate a dolly's drive capability and adjust the dolly's speed. The drive capability may be controlled through the control device 130 or a separate drive control device.

A system control device 130 may be communicatively coupled to the power unit computer 122 via a network 140. Data from the power unit computer 122 may be displayed through the control device 130. A user may subsequently manipulate the data or provide instructions to the power unit computer 122 through the control device 130. In an exemplary embodiment, calculations for adjustments may be implemented through software embedded in the power unit 120. In some alternative embodiments, the calculations may be made in the dolly control unit 110 or on the control device 130.

Figure 2:
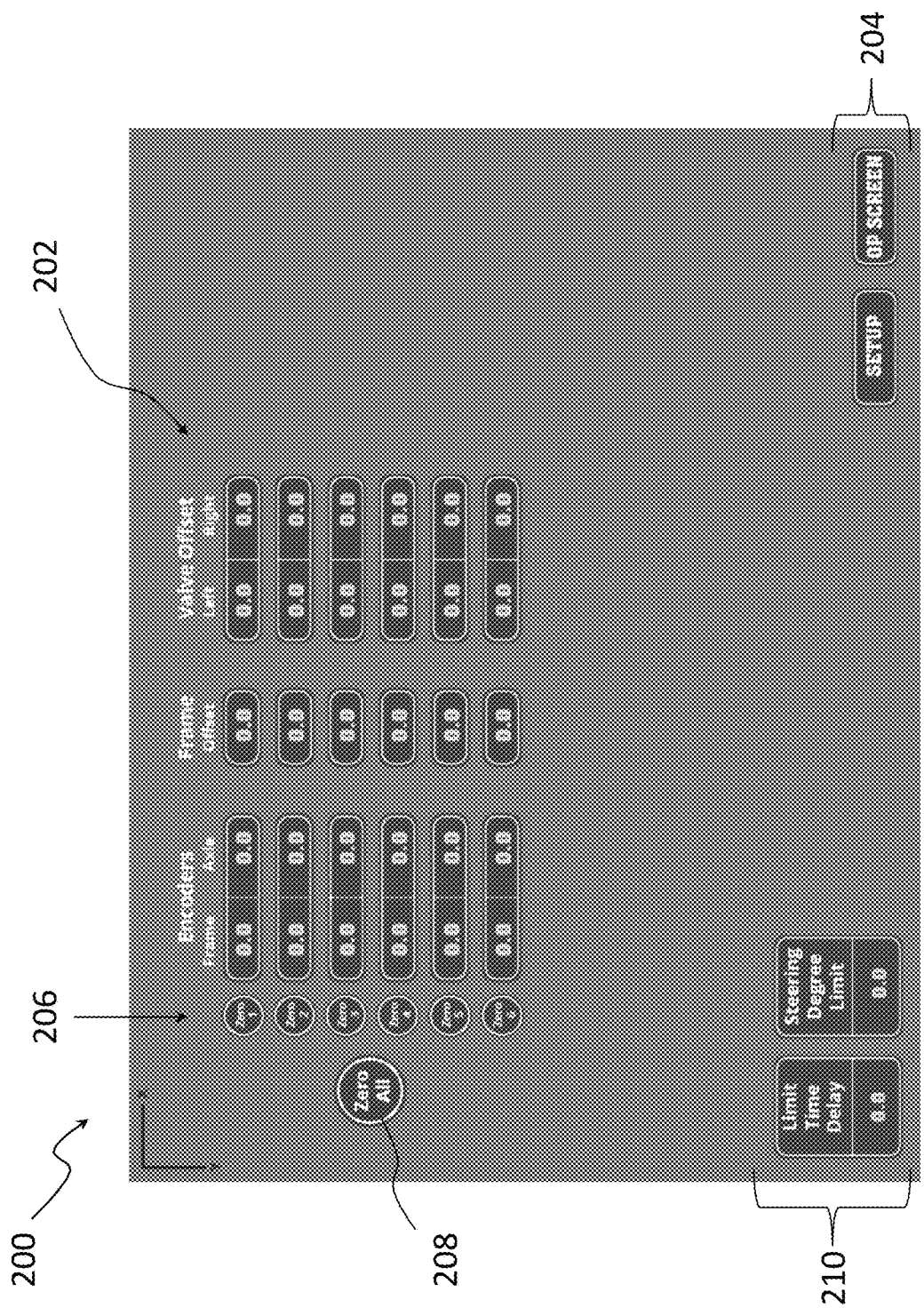
FIG. 2 shows a graphical user interface of a control device.
Figure 3:
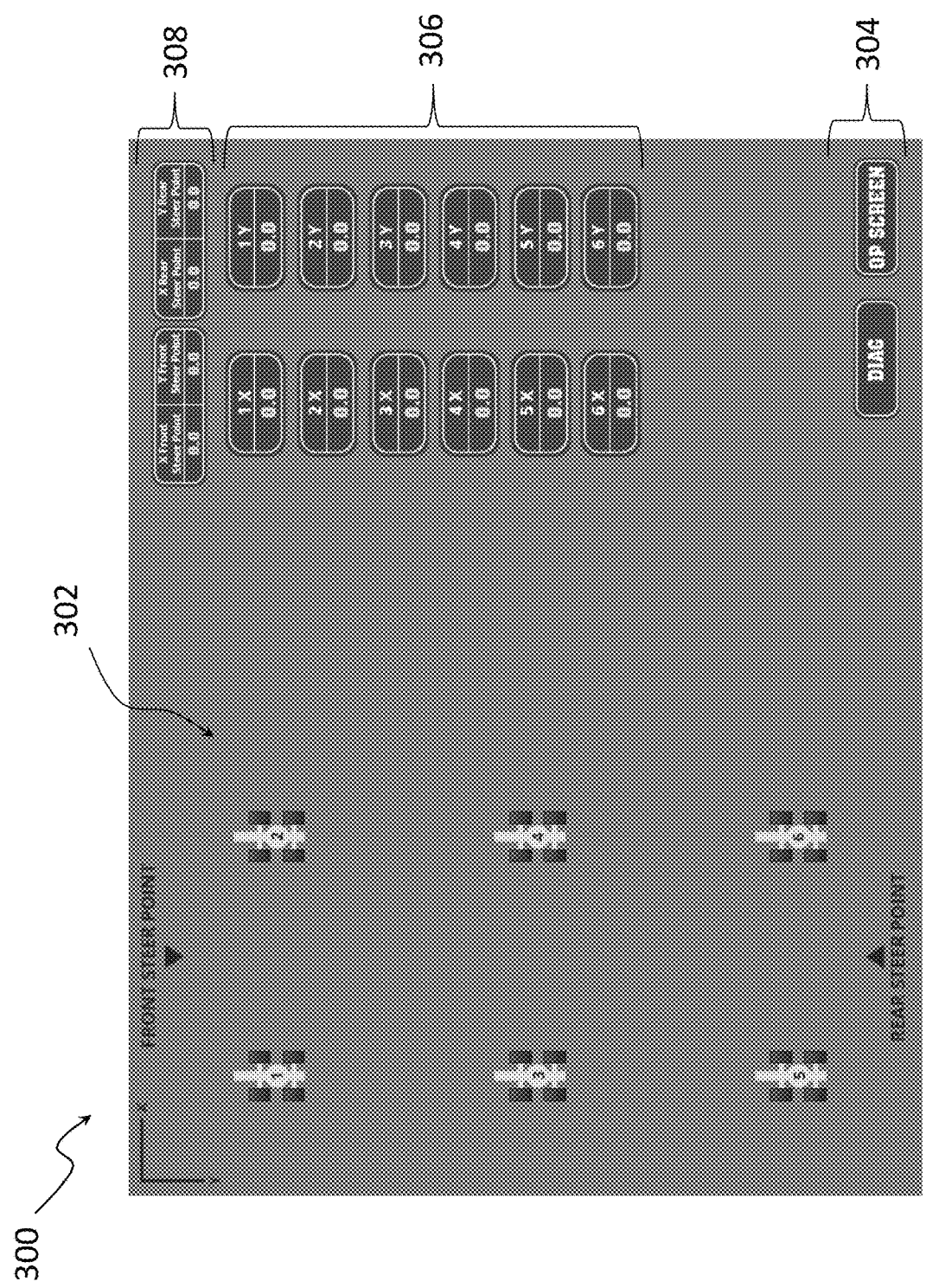
FIG. 3 shows a graphical user interface of a control device.
Figure 4:
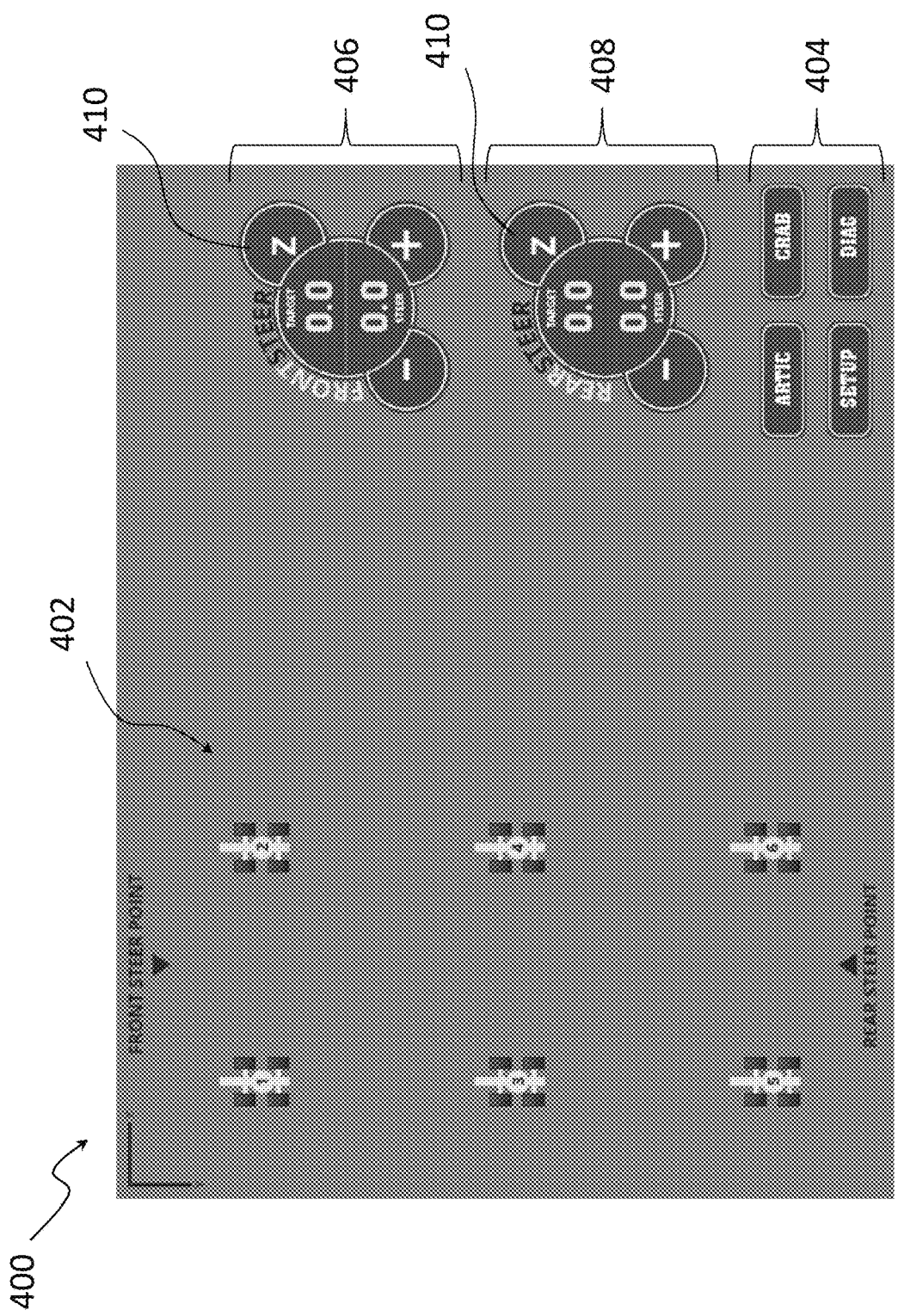
FIG. 4 shows a graphical user interface of a control device.

Now referring to exemplary FIGS. 2-4, a graphical user interface presented through the control device 130 may be provided. One exemplary page, as shown in FIG. 2, may be a setup page 200. The setup page 200 may show baseline data 202 for the at least one dolly used in the system and allow a user to edit the data. The data may include dolly dimensions and location data. The page 200 may further allow a user to zero the baseline data for individual dollies through individual zero buttons 206 or zero the baseline data for all dollies through a master zero button 208. Still further, it may allow a user to set limitations on time delay and steering degree through limit control buttons 210. The page may also include buttons 204 to access other pages presented through the control device 130, such as a diagram page 300 and an operation page 400.

As shown in exemplary FIG. 3, a diagram page 300 may show the components of the transport system 100, including a diagram 302 of the location of the dollies in use. A user may enter X and Y coordinates for each dolly 108 being used through input fields 306. The user may further enter an X and Y coordinate for a front and a rear steer point for the load through input fields 308. In an exemplary embodiment, the steer points may be along a centerline at the front and rear of the load. However, the steer points are not limited to a specific location for the system to make the necessary calculations. Page 300 may further include buttons 304 for accessing other pages.

As shown in exemplary FIG. 4, an operation page 400 may be used to steer the load. An exemplary operation page 400 may include a diagram of the system showing the individual dollies, a front steer point, and a rear steer point. The user may further select a steering method through buttons 404 on operation page 400. The steering methods may include standard steering, articulated steering, and crab steering, as discussed further below. The user may access other pages, such as the setup page 200, through buttons 404. A user may zero the steer point controls for each steer point with zero buttons 410. Once the necessary data has been input in the system, a user may enter a desired adjustment to the front and rear steer points of the load through front steer point control 406 and rear steer point control 408. The controls may allow a user to incrementally adjust the angle of each steer point. In an exemplary embodiment, the user may determine a desired angle through visual observation. The user may maintain a desired adjustment or may increase or decrease the adjustment while the load is in motion. A user may therefore actively steer the load by adjusting the desired front and rear steer point orientations. The adjusted input may be in degrees. Basing the calculations on the steer points and angles of the dolly frames in relation to the load allows for adjustments to the load orientation on the fly.

Figure 5:
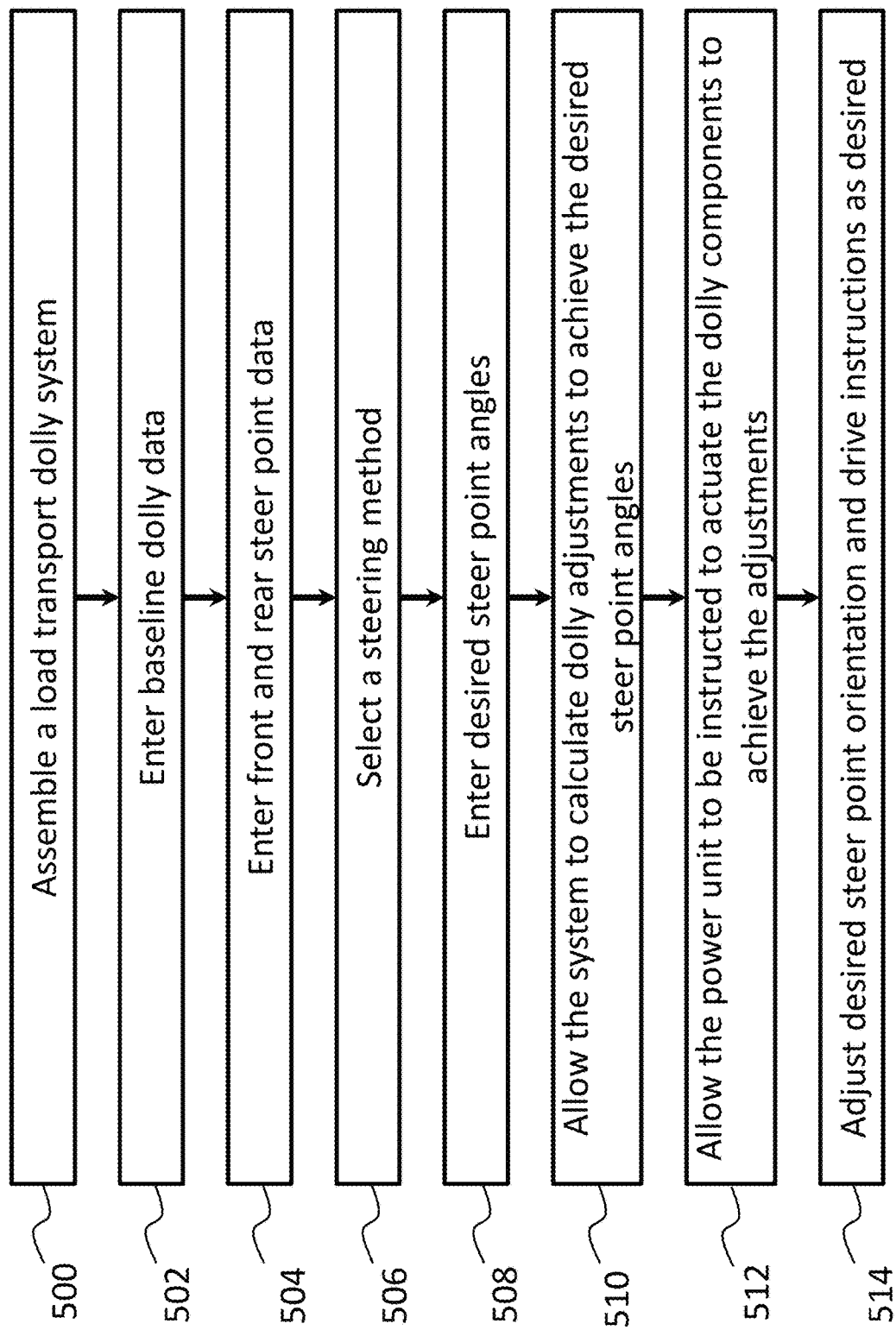
FIG. 5 shows a flow chart for operating a dolly transport system.

Referring now to exemplary FIG. 5, transporting a load may operate as follows. A system, as substantially described above, may be assembled 500. A user may input all of the necessary baseline data, including the dolly dimensions and initial dolly location coordinates 502. The user may then enter location coordinates for a front and rear steer point of the load 504. Once the steer points have been entered, a user may enter a desired steering method 506. Steering methods may include standard, articulated, and crab steer. Standard steering may turn a front or rear steer point and the load may follow. Articulated steering may turn a front steer point and rear steer point such that they are oriented at angles in opposite directions. This may result in a tighter turning radius. Crab steer may allow all steer points to move in the same direction, allowing the load to move sideways or at a desired angle. The turning of steer points may be set as a desired turn angle 508. Individual dollies may turn at varying angles to achieve the desired steer point angle. The system may further operate in forward or reverse, utilizing the same steering controls and calculations. In still further embodiments, the system may be tied to other systems in order to work in conjunction. For example, the system may tie into a hydraulic platform trailer system, allowing the dollies to synchronize with the wheel system of the hydraulic platform trailer.

Based on a desired orientation of the front and rear steer points of the load, a calculated steer point may be determined. The calculated steer point may then be used to determine the desired orientation for each individual dolly frame and front axle to achieve the desired front and rear steer point orientations for the load 510. For example, if a user enters a front steer point angle of +15° and a rear steer point angle of −15°, then a calculated steer point may be determined at the intersection of lines running from the front and rear steer points, perpendicular to the angles of the front and rear steer points. Once the calculations have been made, the power unit may be instructed to actuate the dolly components to achieve the adjustments 512. The at least one dolly may also be instructed to move forward or backward or brake. The desired steer point orientation and drive instructions may be adjusted as desired during operation 514.

Angles of the individual dollies necessary to achieve the desired front and rear steer point orientation may be determined from the calculated steer point. In addition to turning the front axle to achieve the desired angle, the orientation of the top cap of a dolly may be adjusted. This may allow a dolly to rotate under a load without requiring the load to match the rotation. From the calculated steer point, the orientation of the dolly frames and front axles necessary to complete a desired maneuver may be determined.

Figure 6:
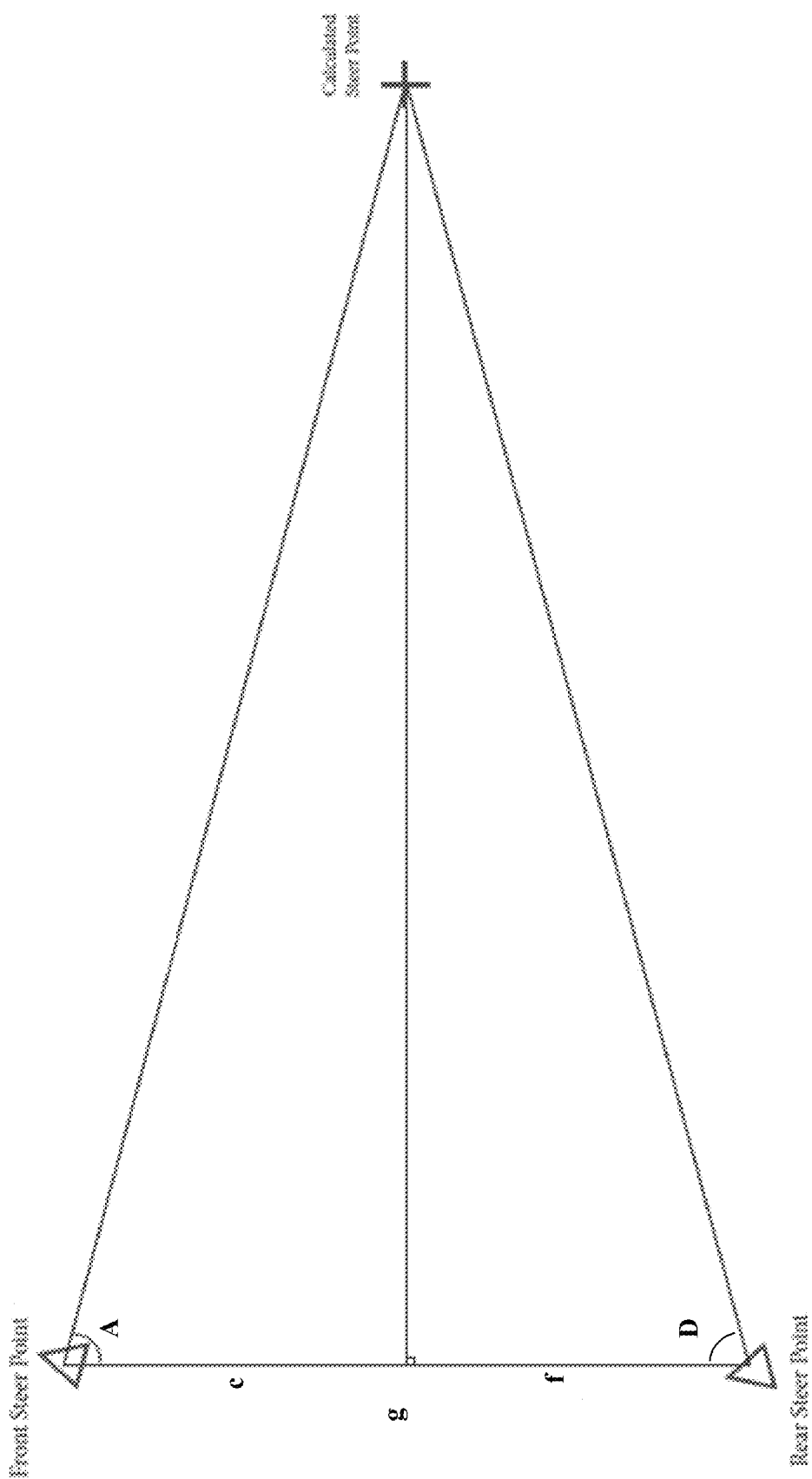
FIG. 6 shows a steer point diagram.
Figure 7:
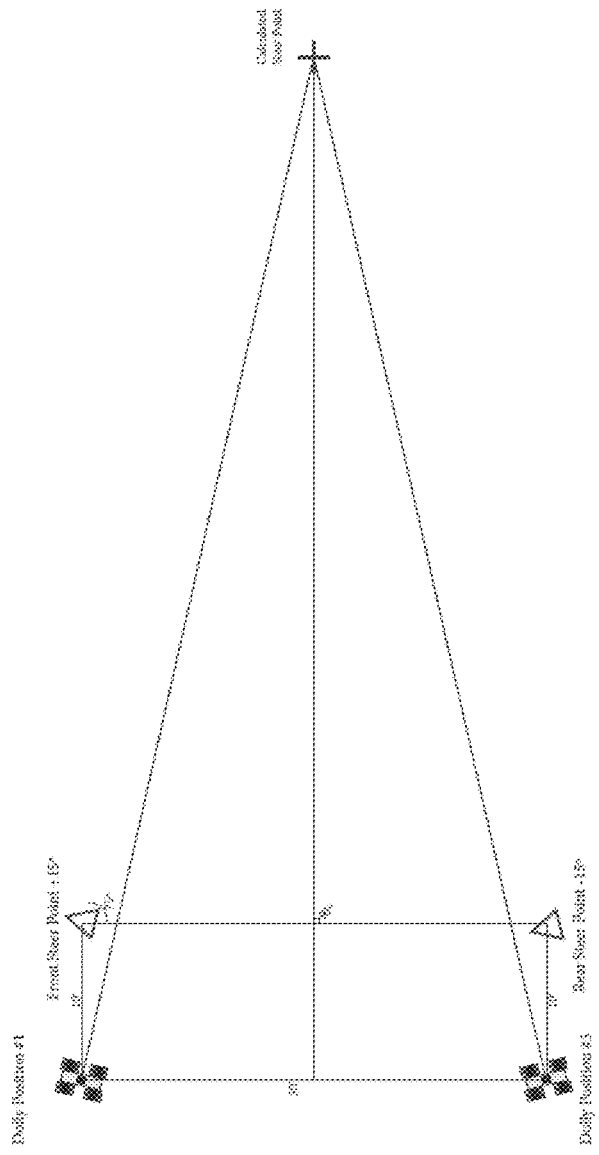
FIG. 7 shows a steer point diagram.
Figure 8:
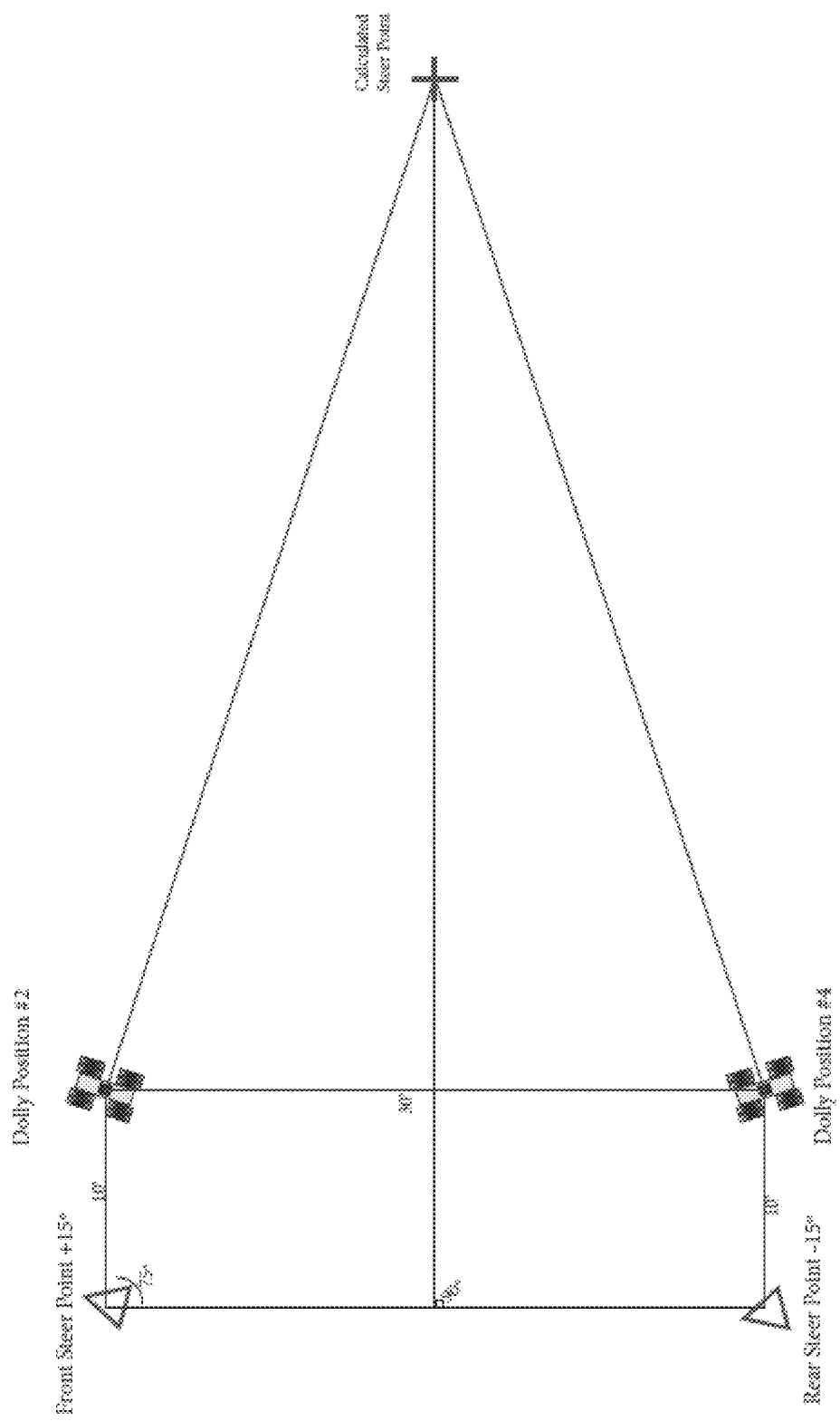
FIG. 8 shows a steer point diagram.
Exemplary

As shown in exemplary FIG. 6, a calculated steer point may be the intersection of a line travelling from the front steer point and a line travelling from the rear steer point, each line being perpendicular to the desired angles of the front and rear steer points. As shown in exemplary FIGS. 7 and 8, the necessary angles of orientation for a dolly may then be calculated from the calculated steer point. The system may know the location of an individual dolly in relation to the front and rear steer points from the baseline entries inputted by the user. Here, dolly #1 may be ten feet to the left of the front steer point. Also, the specific angles of the dolly frame and the dolly front axle required to achieve the necessary dolly orientation may be determined. The dolly orientation for a dolly #2, to the right of the steer point, may be different from that of dolly #1. In an exemplary embodiment, a dolly closer to the calculated steer point may have a sharper angle of orientation.

In an exemplary embodiment, and referring generally to FIG. 6, the following algorithms may be used to determine X and Y coordinates for a calculated steer point (CSP), using a front steer point (FSP) and rear steer point (RSP).

$$X_{CSP}=X_{FSP}+(g/\sin(A-D)*\sin(90+D)*\sin(90-A))$$

$$Y_{CSP}=Y_{FSP}+(g/\sin(A-D)*\sin(90+D)*\sin(A))$$

Once the calculated steer point has been determined, the proper steer angles for the axle and frame of each dolly can be determined. The distances among the dollies and the steer points may be known through the user entries. Similarly, the desired angles of orientation for the steer points may be known through user entry. The known data may allow the system to calculate the necessary dolly orientations to achieve the desired steer point orientations.

Figure 9:
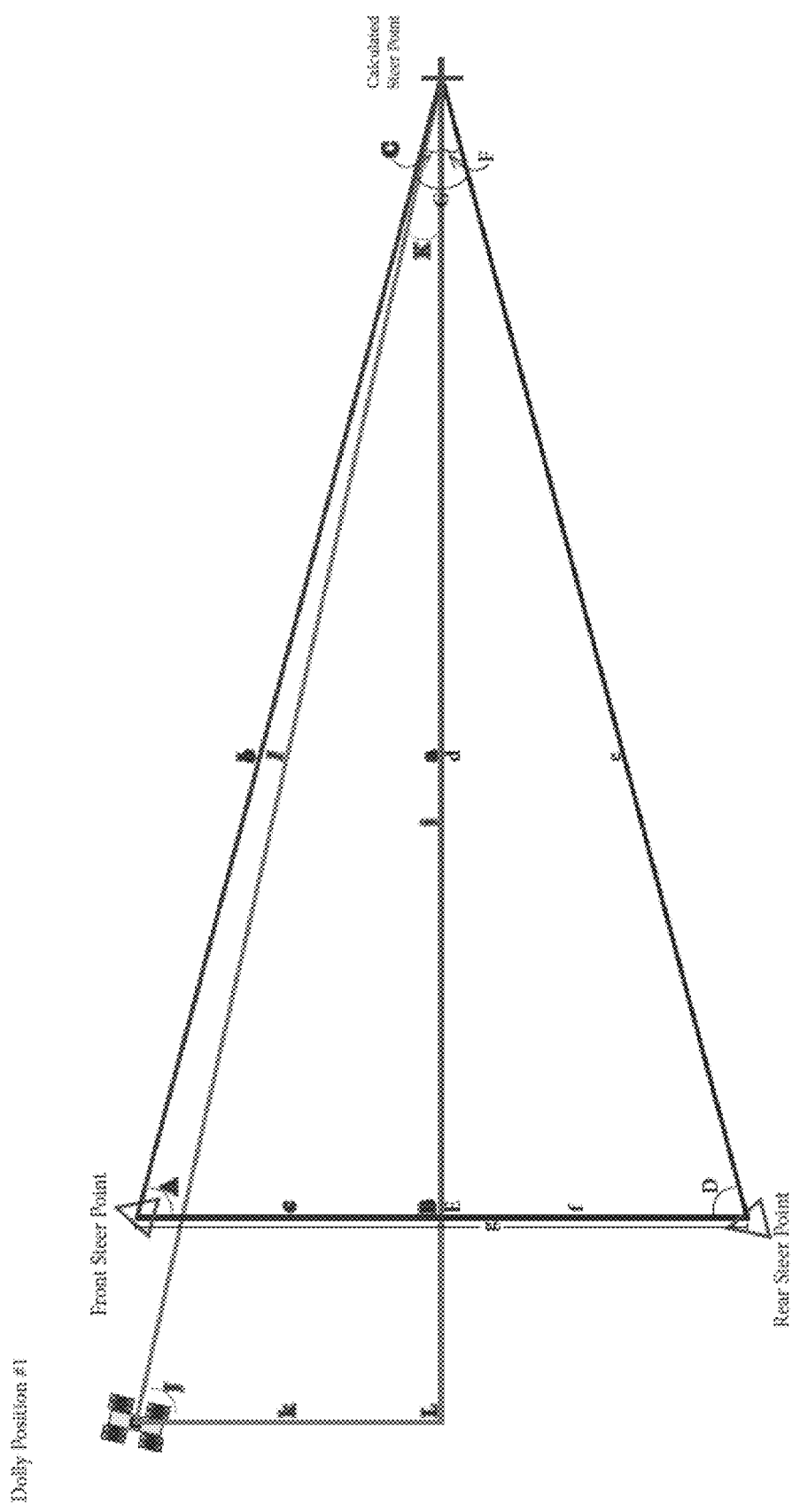
FIG. 9 shows a steer point diagram.
Exemplary
Figure 10:
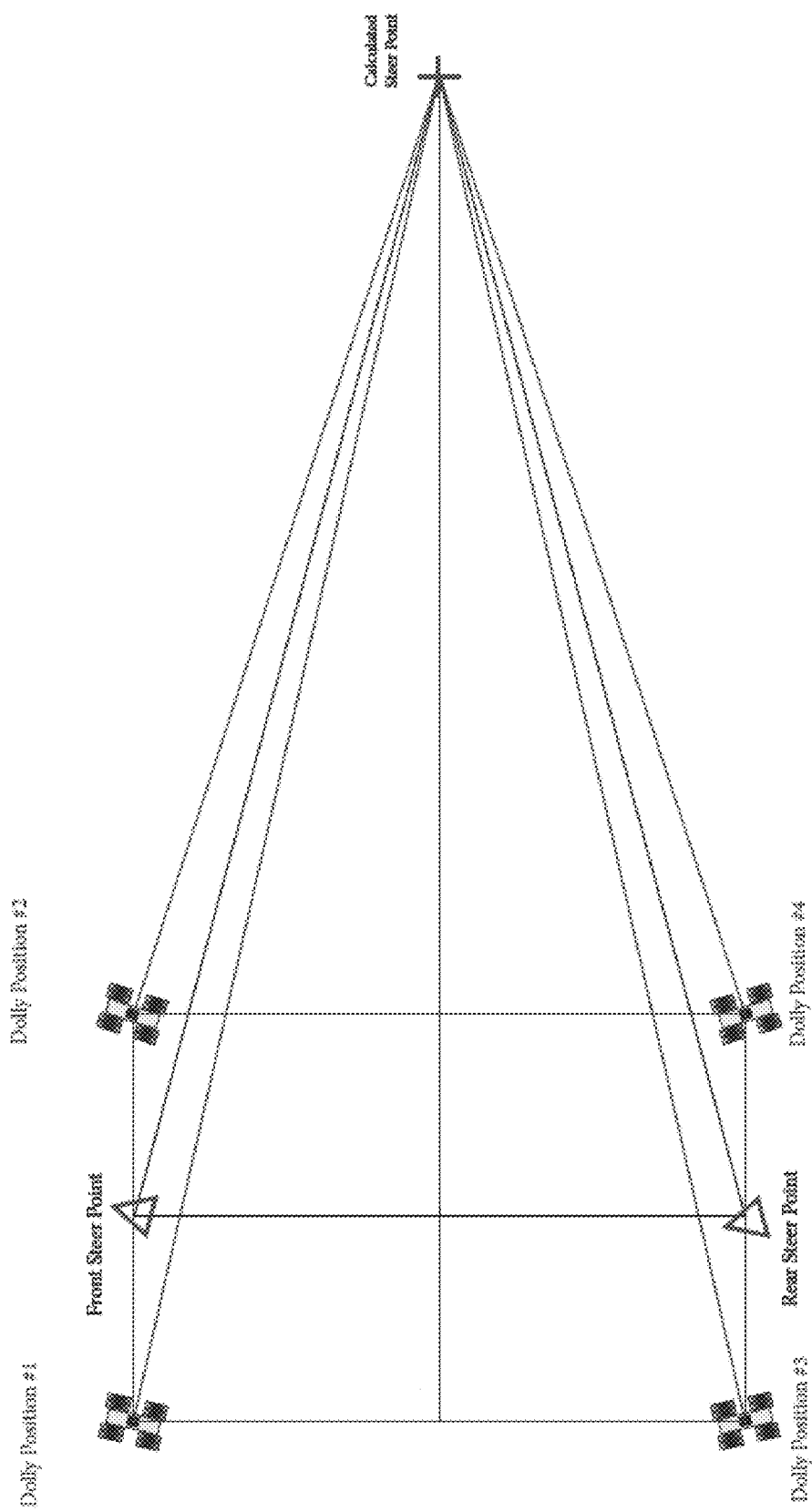
FIG. 10 shows a steer point diagram.
Exemplary

Exemplary FIGS. 9 and 11 may show the dimensions used in the below algorithms to calculate desired dolly frame and axle angles. Exemplary FIG. 10 may show a diagram depicting the relationship of a plurality of dollies to the steer points, such that angles for each dolly may be calculated similarly. Dolly #1 may be used as an example in the present calculations and depictions. The following algorithm may be used to determine a desired dolly frame angle, J: $J=\tan^{-1}(k/j)-\sin^{-1}(s/\sqrt{(-k)^2+(-j)^2})$.

Figure 11:
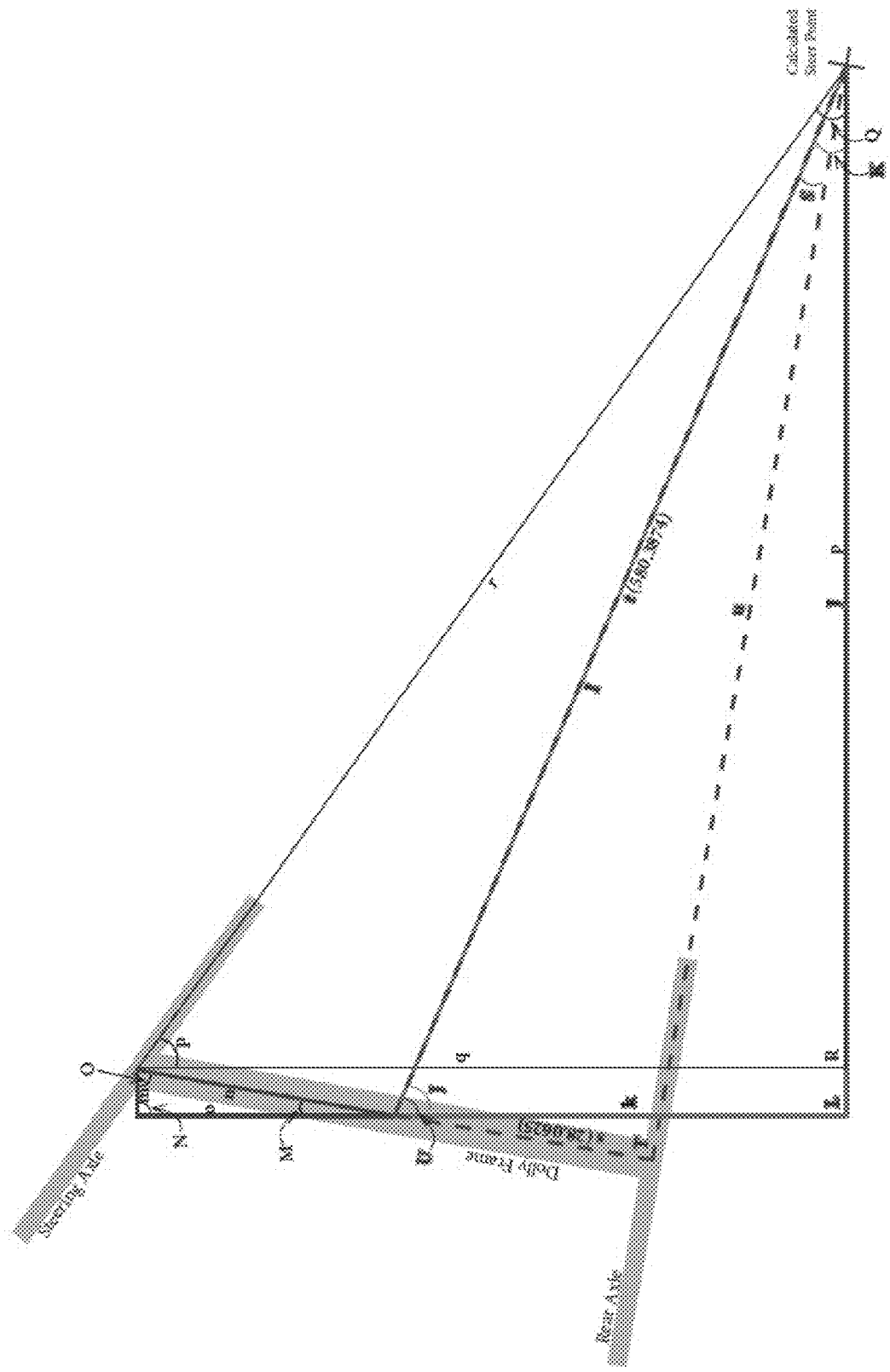
FIG. 11 shows a steer point diagram.
Exemplary

As shown in exemplary FIG. 11, s may equal the dimension from a dolly rear axle to a dolly cap and n may equal the dimension from a dolly front axle to a dolly cap. The system may continuously make calculations as the dolly moves, so as to adjust the steer angle of the front axle to maintain a desired orientation to the steer point throughout a turn. The data used for the continuous calculations and adjustments, or fine-tuning, of the steer angles may be shown in FIG. 11. In an exemplary embodiment, the following algorithm may be used to determine a desired front axle angle, P: $P=\tan^{-1}((s+n)/\sqrt{((k^2+j^2)-s^2)})$.

Once target steer angles have been calculated, the system may use data measured by the encoders to determine actual steer angles. The system may correct any differences between the target steer angles and actual steer angles. An exemplary dolly transport system may further have an automatic shut off and alert in the event of certain malfunctions. For example, if communication is lost with one of the components, the system may stop the load and alert a user to the malfunction. Generally, if dollies are recognized as being off track, the calculations performed by the system may compensate the steering to bring the dolly back to a desired position and orientation. However, a user may pre-set an allowance for how far a component can go out of sync through the control device 130. Once a component exceeds the limit, the system may stop movement and alert a user to the malfunction.

Figure 12:
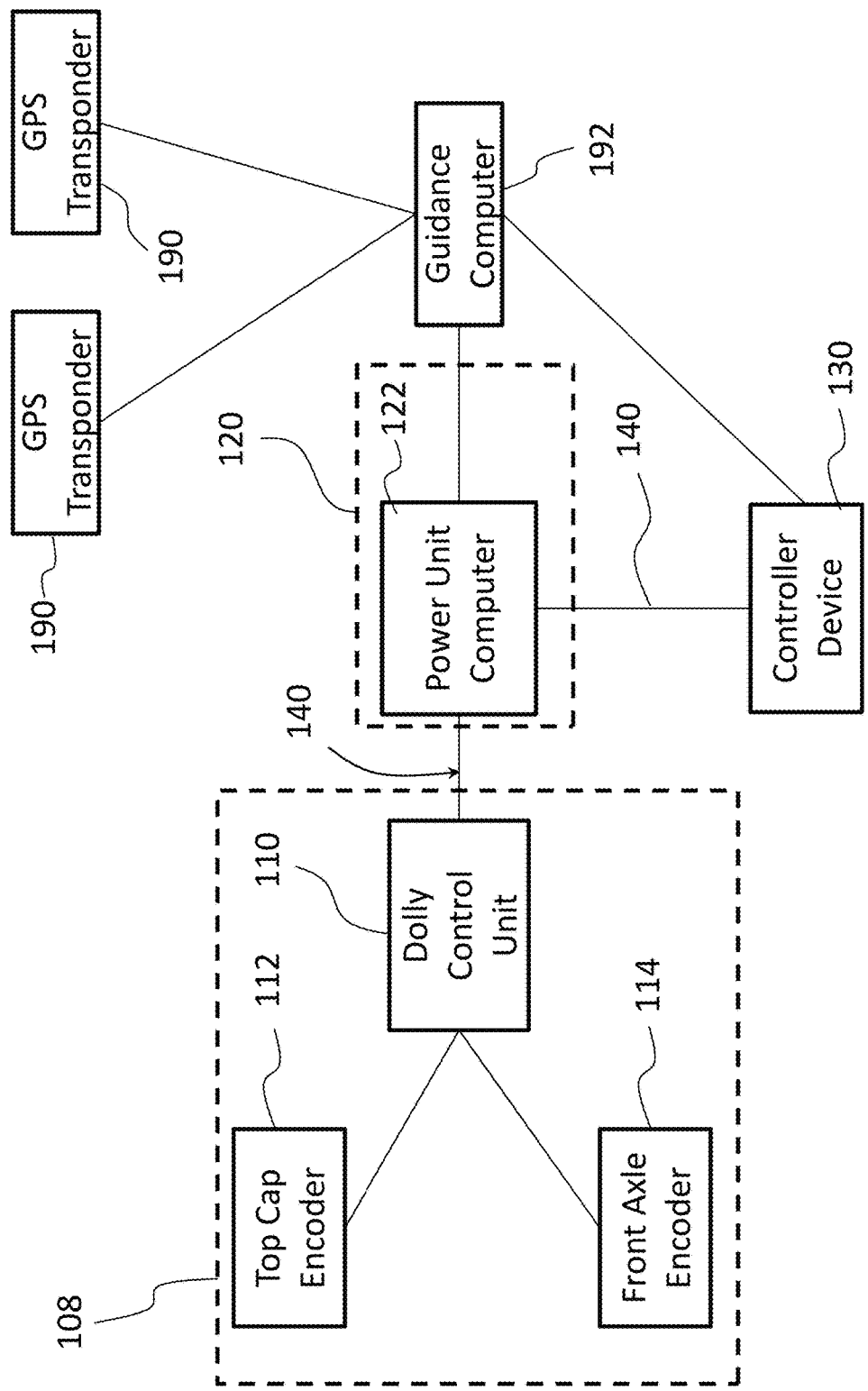
FIG. 12 shows a diagram of a dolly transport system.

In some alternative exemplary embodiments, laser measurement and/or communication devices may be utilized. In still other exemplary embodiments, as shown in exemplary FIG. 12, GPS devices may be used to facilitate controlling the system. GPS may be effectively implemented to aid in controlling the overall system through the use of localized GPS transponders 190 and GPS coordinate mapping. At least one GPS transponder 190 may be placed on a load or dolly. In an exemplary embodiment, a localized GPS transponder may be placed at each steer point. GPS transponders 190 may be placed in a variety of locations on a load, including the sides or corners. The GPS transponders 190 may aid in calculating and projecting a course for the load. While underway, the GPS transponders 190 may aid in keeping the load on a desired path and correcting for any errors. Each GPS transponder 190 may receive a signal from a GPS satellite or pseudolite. The GPS signal may be used to determine a GPS-based geographical location of the point on the load where the transponder 190 is located. The GPS data may be utilized by a guidance computer 192 for plotting a course or controlling a load. The guidance computer 192 may be at least one power unit computer 122 or may be communicatively coupled to the at least one power unit computer 122. In some exemplary embodiments, the guidance computer 192 may further be communicatively coupled with a controller device 130. Guidance computer 192 may communicate through wired or wireless connections. In an exemplary embodiment, a guidance computer 192 and power unit computer 122 may utilize user inputs and measured data to facilitate guidance of a load. When setting a course for a load, a user may create a track of coordinates for each steer point, or GPS transponder location. In an exemplary embodiment, this may include a track for a front steer point and a track for a rear steer point. However, in alternative exemplary embodiments, more or less steer points may be used. For example, side steer points may also be used. The GPS-based geographical location data may be compared to the pre-plotted track data as the system is used. The system may actuate adjustments to the dolly steering and drive capabilities so as to direct the GPS transponders along a plotted course. The system may further utilize known load dimensional data in combination with GPS-based transponder location data to plot a course or steer a load. The system may utilize steering calculations, substantially as described above, to achieve desired steer angles to follow a plotted course or correct for errors. In some exemplary embodiments, the angle calculations may be in increments.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A load transport system comprising:
   at least two physically independent dollies configured to transport a single load, wherein at least one of the at least two dollies is a power dolly configured to independently drive a load by controlling speed and direction, and wherein each of the at least two dollies comprise a top cap encoder, wherein the top cap encoder reports the rotation of the dolly at all times by monitoring the orientation of a top cap in relation to a dolly frame, and a front axle encoder communicatively coupled to a dolly control unit, wherein the top cap encoder and front axle encoder communicate measured data to the dolly control unit;
   at least one power unit, the power unit comprising a power unit computer communicatively coupled with the at least one dolly control unit via a network, wherein the at least one dolly control unit communicates measured data to the power unit computer; and
   a single control device, the control device configured to communicate with the power unit computer via a network and allow a user to view and manipulate system data, and provide instructions to the power unit computer;
   wherein the power unit computer is configured to calculate adjustments to the at least two dollies based on dolly control unit data and user input data to effect user instructions, the dolly control unit data and user input data comprises location data for each of the at least two dollies in relation to preset steer points, dolly frame and dolly axle orientation data, top cap orientation data, a front steer point angle and a rear steer point angle; and
   wherein the power unit is configured to actuate the at least one power dolly's longitudinal movement and the at least two dollies' steering.

2. The system of claim 1, wherein the network is a Controller Area Network (CAN).

3. The system of claim 1, further comprising at least one coaster dolly having power steering.

4. The system of claim 1, further comprising at least two power dollies, wherein the at least two power dollies are configured to drive in parallel.

5. The system of claim 4, further comprising a plurality of communicatively coupled power units for controlling the plurality of dollies.

6. The system of claim 1, wherein the at least one dolly is a hydraulic dolly and the at least one power unit is a hydraulic power unit, further comprising hydraulic actuators hydraulically coupled to the at least one dolly and configured to actuate components of the at least one dolly for steering in coaster dollies and for steering and movement in power dollies.

7. The system of claim 1, wherein the power unit computer comprises a means for calculating a necessary dolly orientation to achieve a user instruction.

8. The system of claim 1, further comprising at least one Global Positioning System (GPS) transponder.

9. The system of claim 1, wherein the top cap is a support surface secured to a load being transported.

\* \* \* \* \*